United States Patent
Constable

(10) Patent No.: US 6,827,153 B2
(45) Date of Patent: Dec. 7, 2004

(54) GARDEN TOOL

(76) Inventor: Robert Edward Constable, Upper Woolwich Oast, Mounts Lane, Rolvenden, Kent TN17 4NX (GB)

(*) Notice: Subject to any disclaimer, the term of this patent is extended or adjusted under 35 U.S.C. 154(b) by 0 days.

(21) Appl. No.: 10/151,231

(22) Filed: May 20, 2002

(65) Prior Publication Data

US 2002/0189827 A1 Dec. 19, 2002

(30) Foreign Application Priority Data

May 19, 2001 (GB) ............................................. 0112315

(51) Int. Cl.[7] ............................................... A01B 1/16
(52) U.S. Cl. .......................... 172/377; 172/381; 111/98
(58) Field of Search ................................. 172/371, 377, 172/381; 16/110.1; 7/114, 116; 111/92, 97, 98; 294/50, 50.5, 50.6, 50.7, 50.8; 29/DIG. 104

(56) References Cited

U.S. PATENT DOCUMENTS

| | | | | |
|---|---|---|---|---|
| 933,227 A | * | 9/1909 | Billau ............................ 7/114 |
| 1,065,456 A | * | 6/1913 | Lowrey ...................... 294/50.6 |
| 1,777,029 A | * | 9/1930 | Bradford ..................... 172/381 |
| 1,867,086 A | * | 7/1932 | Meixell .......................... 7/114 |
| 2,035,967 A | * | 3/1936 | Humphrey ................. 294/50.5 |
| 2,036,433 A | * | 4/1936 | Nisewanger ................ 111/101 |
| 2,057,067 A | * | 10/1936 | Smith ........................ 294/50.7 |
| 2,251,587 A | * | 8/1941 | Gagner .......................... 30/303 |
| 2,282,673 A | * | 5/1942 | Peterson .................... 294/50.7 |
| 2,618,500 A | * | 11/1952 | Peach .......................... 111/101 |
| 2,928,483 A | * | 3/1960 | Trost ............................ 172/378 |
| 3,198,719 A | * | 8/1965 | Stewart ..................... 294/50.5 |
| 3,443,830 A | * | 5/1969 | Jones ........................ 294/50.7 |
| 3,847,227 A | | 11/1974 | Myers ......................... 172/378 |
| D241,410 S | * | 9/1976 | Atkinson et al. .............. D8/13 |
| 4,715,634 A | | 12/1987 | Mueller et al. ............ 294/50.5 |
| 5,056,440 A | * | 10/1991 | Eissens ........................ 111/7.1 |
| 5,156,101 A | * | 10/1992 | Wien .......................... 111/101 |
| 5,234,241 A | * | 8/1993 | Ikerd ......................... 294/50.8 |
| 5,338,078 A | * | 8/1994 | Basek ........................ 294/50.5 |
| 5,452,767 A | * | 9/1995 | Smotherman ................ 172/25 |
| 5,492,181 A | * | 2/1996 | Grant ........................... 172/22 |
| 5,615,744 A | | 4/1997 | Krafka ......................... 172/22 |
| 5,664,819 A | * | 9/1997 | Conrad ...................... 294/50.6 |

FOREIGN PATENT DOCUMENTS

| | | | | |
|---|---|---|---|---|
| EP | 0 605 129 | | 7/1994 | |
| GB | 2320998 A | * | 7/1998 | ............ A01B/1/16 |

* cited by examiner

*Primary Examiner*—Robert E. Pezzuto
*Assistant Examiner*—Alexandra K. Pechhold
(74) *Attorney, Agent, or Firm*—Nields & Lemack

(57) ABSTRACT

A garden tool with a non-slip handle grip, designed for immediate and not difficult removal of deep-rooted plants such as Thistle and Dock weeds. The body of the tool is of rigid and strong construction, with angled cutting faces and includes a plant/soil containment chamber. The tools angular cutting faces and profile, are designed to produce efficient insertion and soil compression when downward thrust is applied, which therefore holds captive the plant root in the containment chamber, hence achieving successful plant removal from the ground when the tool is withdrawn. The slotted front of the containment chamber allows for unwanted plant and soil removal from the tool. Optional hand and foot cross-members added, to produce more forceful insertion into and easier withdrawal from the ground, and to create a convenient standing operating stance, when using the tool.

5 Claims, 4 Drawing Sheets

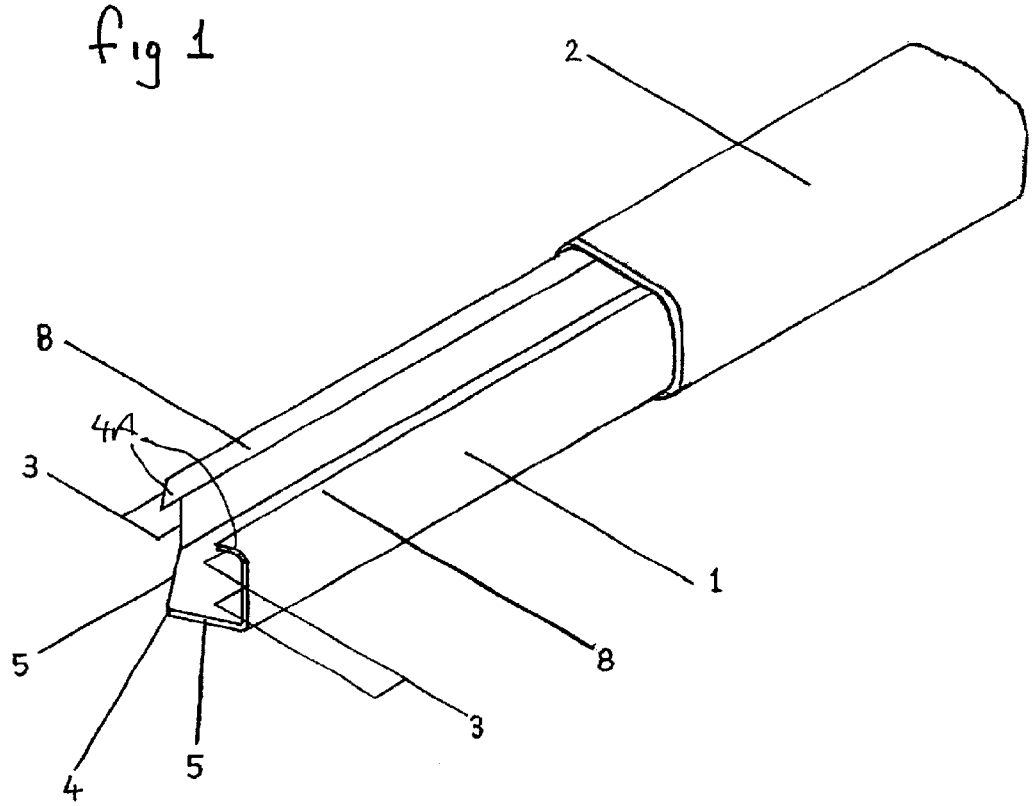

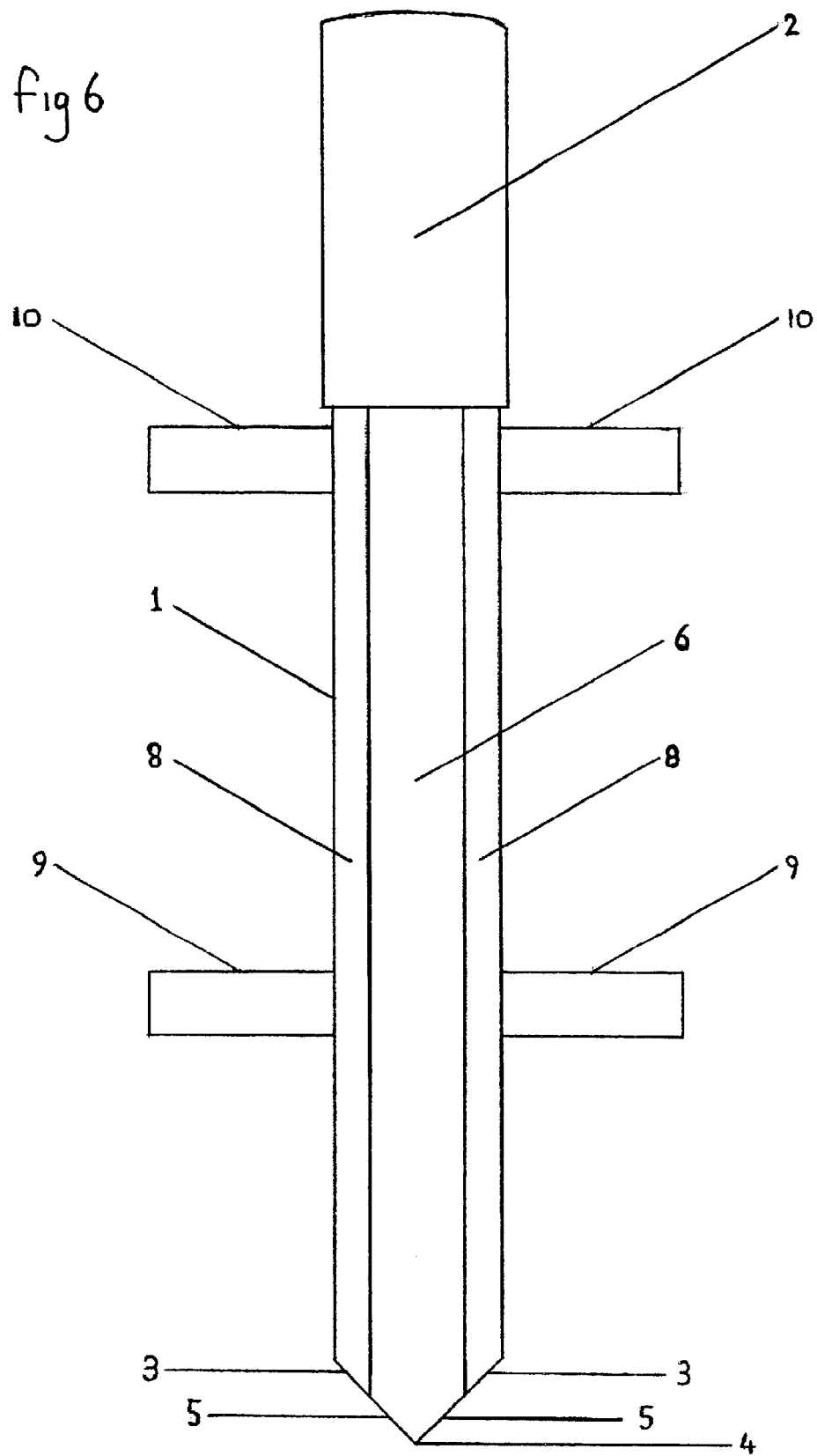

GARDEN TOOL

The invention relates to a plant/weed extraction tool that is designed particularly, but not exclusively, to extract deep-rooted plants such as dock and thistle quickly, with realistic ease and minimum ground disturbance.

BACKGROUND OF THE INVENTION

Weeds and their removal have always been and are a constant problem. When considering well-kept gardens and established lawns, the appearance of sporadic weeds is very unwelcome. When the ground is consolidated around the plant, it is difficult to effectuate the plants removal. Currently the solution is to treat the plant with weed killer or to extract it using a common garden tool such as a spade, fork or trowel. Both approaches have disadvantages. For example, weed-killers are poisonous chemicals that have to be handled carefully, and are not eco-friendly. After careful application of the weed-killer, it can take up to 3 weeks for the plant to die, although this is not always successful. Evidence shows that plant recovery can occur. This suggests that the complete root system is not always killed, hence allowing new growth. There have also been problems where the grass (supposedly resistant to relevant weed-killers) surrounding the weed has also been killed, leaving large unsightly bald patches in the lawn. Digging out the weed with conventional tools takes considerable effort, and can produce a large hole with a lot of ground and lawn disturbance, not proportional to the diameter of the common weed root. Extensive and time-consuming lawn repairs may then be necessary.

SUMMARY OF THE INVENTION

An object of this invention is to produce a plant/weed extraction tool, that provides for immediate and not difficult substantially complete extraction of the plant root structure, or so very much of the plant root structure so as to ensure no further growth of the plant. The tool leaves a comparatively small hole that may be filled with loose soil, which is soon covered by natural growth and the encroachment of surrounding grass. A method of making such a tool is a second aspect of this invention.

The present invention is as claimed in the claims.

Preferably the tool's body is generally rectangular in cross-section for inherent strength, but likewise it could be round, square, or elliptical. Such a plant/weed extraction tool is very strong due to the right angle returns of the tools' profile, and may be designed with a penetration point, angled cutting edges, soil compression action and a containment chamber defined by the tubular position with a slotted front to allow quick and easy plant/weed insertion and removal.

Conveniently, insertion is the initial locating of the plant/weed into the tools containment chamber via the slotted front, prior to downward thrust into the ground. Removal is the pulling out of the plant/weed from the containment chamber through the tools slotted front, which may also facilitate the removal of any soil present, by pushing out with a stick, or similar object for example.

Preferably, there are one or more penetration points near the angled cutting edges, which assist accurate location and cutting motion of the tool. The angled cutting edges could be sharpened or otherwise tapered.

There may be provided a specifically engineered tool with a rectangular body for strength and a design that allows for quick and easy plant extraction with minor ground disturbance. An immediate eco-friendly removal solution to deep-rooted or otherwise, plants and weeds.

Soil compression within the tool's containment chamber, occurs when the tool is thrust downward in the ground. The wall of the tool displaces the same quantity of soil as its wall thickness. This displacement creates additional enough holding compression around the soil/root plug by forcing soil into the narrower space of the tool's containment chamber 6 of FIG. 4, compared to the slightly larger ground space/area that existed before the tool was inserted into the ground.

Preferably the tool is made from metal with a non-slip plastic/PVC/rubber type handle grip. But it may instead be made from plastics material, wood or a combination of these materials.

A preferred embodiment of the invention will now be described with reference to the accompanying drawings in which:

BRIEF DESCRIPTION OF THE DRAWINGS

FIG. 1 Shows in perspective, the complete weed removal tool.

FIG. 6 demonstrates the plant/weed removal tools optional hand and foot cross-members, added to produce easier insertion and removal operations.

DETAILED DESCRIPTION OF THE INVENTION

Figures 2, 3:
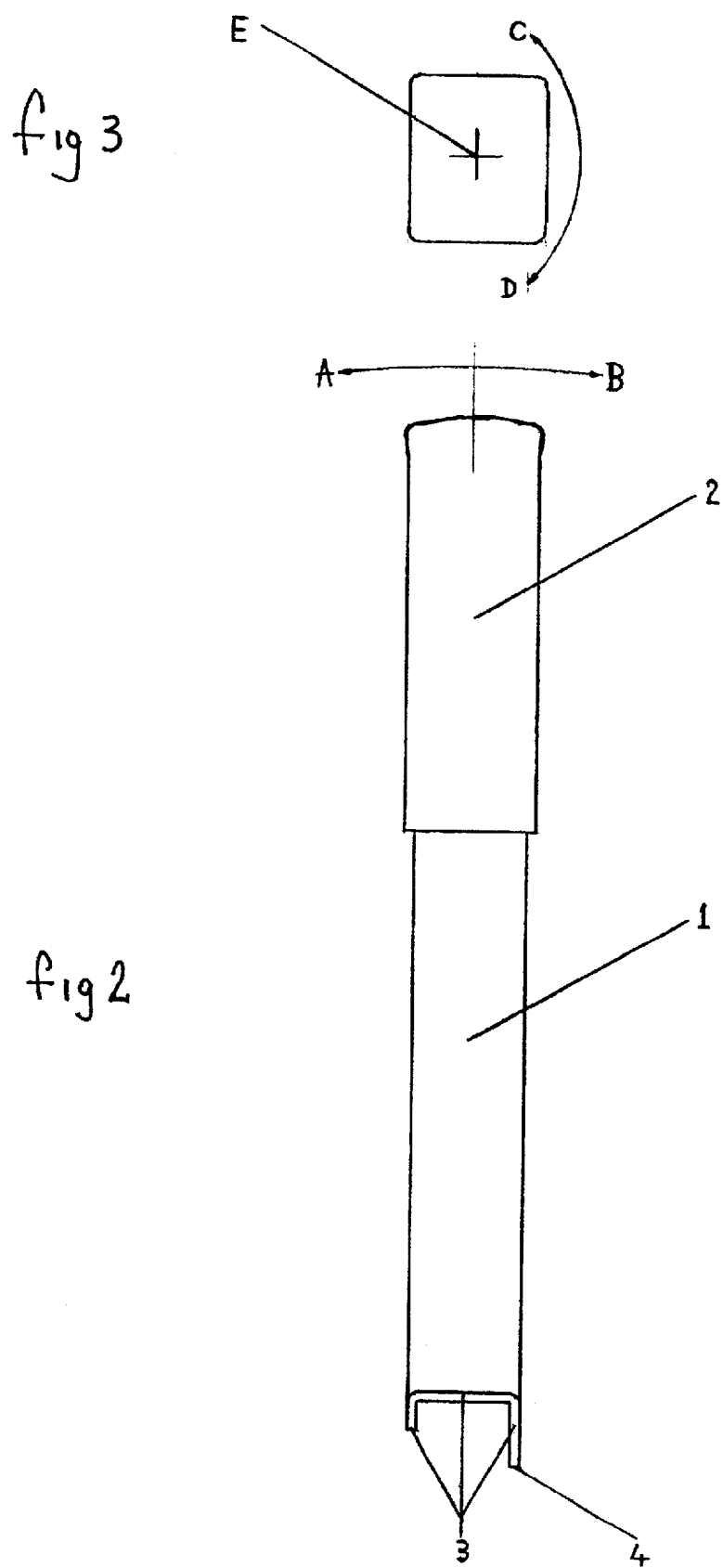
FIG. 2 Shows a side elevation emphasising the leading cutting edges.
FIG. 3 Shows the closed handle grip end elevation.

Referring to the drawings and FIG. 1, the tool 1 is of rigid construction with a suitable handle grip 2 to provide comfort and assist with in-use power transfer when inserting the tool into the ground. The performance of the tool is directly related to its strength and power transfer capability, in both insertion and twisting operations. The grip 2 covers a plastics cap 20 (see FIG. 5) which caps the end of the tool to protect the grip 2 from wear by the end of the tube 1.

FIGS. 1 and 2 show penetration point 4 and the leading cutting edges 3, which assist with ground insertion when downward thrust is applied.

Figure 4:
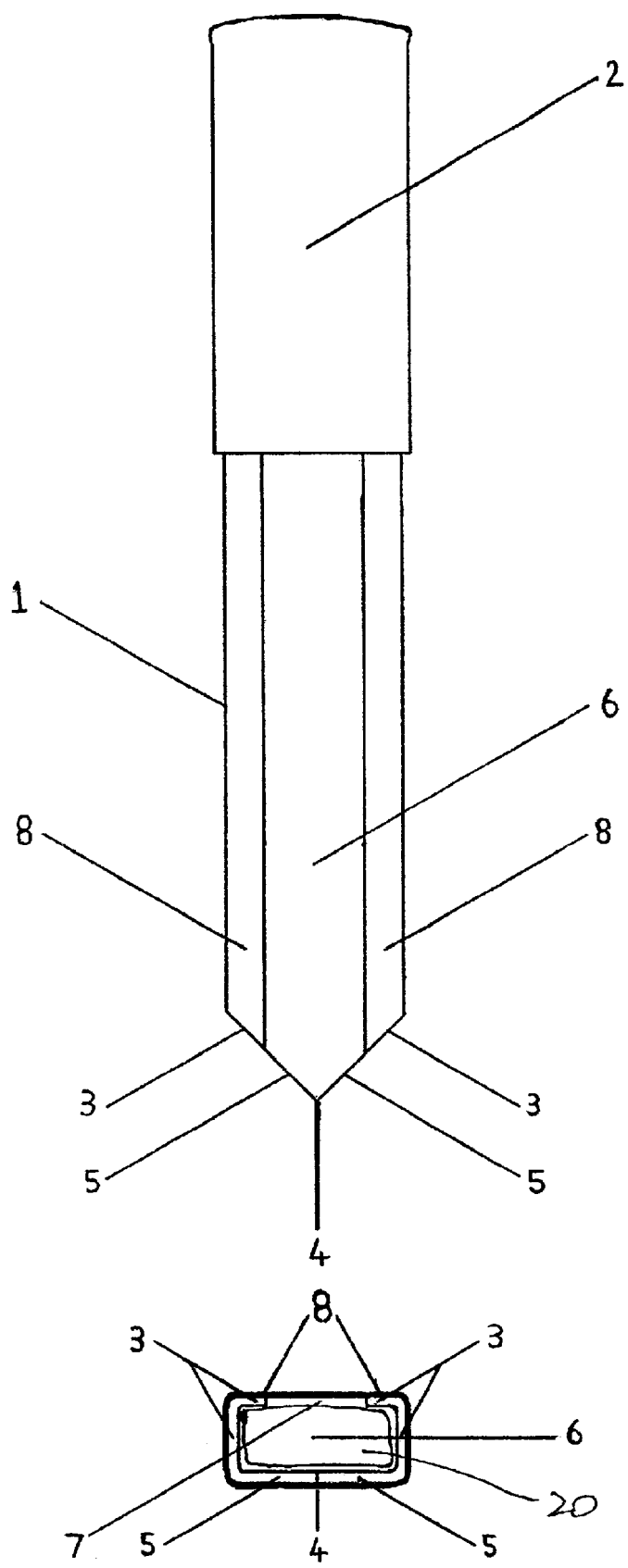
FIG. 4 shows a front elevation of the tool, with the penetration point and plant/soil containment chamber with its slotted front.

As shown in FIG. 4, when inserting the tool into the ground, penetration point 4 and angled sides 5 are the initial working cutting faces. The chamber 6 of FIG. 4 is available for securing combined plant and soil containment during the removal operation.

The penetration point 4 of FIG. 4 is positioned into the ground adjacent to the weed stem. Vertical downward force is applied to the tool, which quickly drives the cutting edges 5 and 3 through the soil. The angled cutting faces 3 of FIGS. 1, 2 and 4 travel downwards and with the assistance of right angle profile returns 8 of FIGS. 1 and 4, creates by soil displacement a compression action within the containment chamber 6 of FIG. 4. This action firmly secures the plant root and surrounding soil within the containment chamber 6 of FIG. 4. Because the soil will not be loosened around the plant root during tool insertion, the soil plug and plant root will remain in the containment chamber when the tool is removed from the ground. Plant size determines the required insertion depth of the tool.

When removing plants and in particular deep-rooted weeds from the ground, it is easier if specific tool movements are completed after the tool has been inserted. Movements in lateral directions A–B of FIG. 2 and rotational twists C–D on axis E of FIG. 3, releases the root structure and withdrawal may be completed. Withdrawal of the tool from the ground, reveals the weed/plant with its root structure in the soil plug, held within the containment chamber 6 of FIG. 4, and some of the longer root (if present) extending beyond the tool. The plant may now be removed out of the tools containment chamber slotted front 7 of FIG. 5, and discarded.

Figure 5:
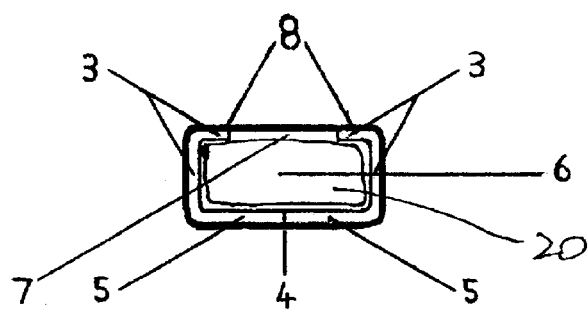
FIG. 5 illustrates the insertion end elevation, showing the tools rectangular shape.

The end elevation of FIG. 5 shows the strength enhancement of the tools rectangular profile. The profile returns 8 of FIGS. 4 and 5 help generate essential soil compression upon continued tool insertion into the ground.

FIG. 6 illustrates the addition of cross-members on a longer device. This enhances the product from a hand tool that requires the user to kneel or bend over when using, to a tool that may be used in a standing position. The cross-member footrest 9 and hand-rest 10, allows the user to exert more body power, when using in a more convenient standing position. This combination will produce easier insertion and removal operations, combined with a user-friendly operating stance, which reduces the need for bending or kneeling and therefore helps keep the users body free from strain.

The tool of FIG. 1 may be made by first folding a piece of galvanised steel of 1.5 mm thickness and 300 mm long to form the generally tubular, slotted body 1 and then performing two vertical cuts at 45° to the axis of the body (in the orientation of FIG. 1) to form simultaneously the pointed projections 4 and 4A and tapered cutting edges vertically between the upper and lower pointed projections.

The other end of the tool is then capped by a cap held in place by a plug portion inserted into the tool end then being covered by grip 2.

The tapered cutting edges may be tapered so as to direct soil into the containment chamber to assist in compressing the soil that enters the chamber.

The pointed projections, where present, assist in initial location of the tool by the weed and initial insertion.

A rectangular cross-section provides strength to the tool to resist bending and buckling on initial insertion as well as on levering the tool to extract it.

What is claimed is:

1. A plant/weed extraction tool including a body, in which:
   (a) said body is elongated, having a first, forward, end, and a second, rearward, end, and is rigid, generally tubular, has an interior surface and an exterior surface and has a rectangular cross-section;
   (b) said body has a first side, a second side opposite said first side, a third side between said first side and said second side and a fourth side between said first side and said second side and opposite said third side;
   (c) said first side defines a longitudinal slot which extends between said first end and said second end for receiving plant/weed foliage;
   (d) said first end includes a first pointed projection, a second pointed projection and a third pointed projection;
   (e) said first pointed projection defines the forward end of said second side and projects forward of said third and fourth sides;
   (f) said second pointed projection and said third pointed projection are positioned one at each side of said slot and together define the forward end of said first side, said second pointed projection and said third pointed projection each project forward of said third side and said fourth side, the forwardmost point of each of said second and third pointed projection points being adjacent said slot.

2. A tool as claimed in claim 1, including a plastics or rubber cap covering the second end of said body, the cap having a plug engagable with said interior surface of said body, and said tool also including a plastics or rubber sleeve covering said cap and a section of said rearward end of said body to provide a handle portion.

3. A tool as claimed in claim 1, in which:
   (a) said first pointed projection has a first point and a first and a second cutting edge extending from said first point rearwards to a respective one of said second side and said third side;
   (b) said second pointed projection has a second point and a third cutting edge extending from said second point rearwards to said third side;
   (c) said third pointed projection has a third point and a fourth cutting edge extending from said third point rearwards to the fourth side;
   d) said third side and said fourth side each has a forward planar end face in which the edge of each end face adjacent said interior surface of the body is forward of the edge of each end face adjacent said exterior surface of the body.

4. A tool as claimed in claim 3, further comprising foot and hand cross-members.

5. A method of making a tool comprising:
   (a) folding a piece of sheet metal to form an elongated, generally tubular body having a rectangular cross-section, said body having a first end and a second end, a first side, a second side opposite said first side, a third side between said first and second sides and a fourth side between said first and second side and opposite said third side; and the body defining a longitudinal slot which extends between said first and second end for receiving plant/weed foliage; and
   (b) performing two cuts each perpendicular to said first side and at 450° to the longitudinal axis of said body at said first end of said body such that said first end includes a first pointed projection, a second pointed projection and a third pointed projection, and in which said first pointed projection defines the forward end of said second side and projects forward of said third and fourth sides and said second pointed projection and said third pointed projection are positioned one at each side of said slot and together define the forward end of said first side, both said second pointed projection and third pointed projection projecting forward of said third side and said fourth side, the forwardmost point of each of said second pointed projection and said third pointed projection being adjacent said slot.

* * * * *